June 24, 1969  R. L. SHALLENBERG  3,451,295
MACHINE TOOL FEED MECHANISM
Filed June 9, 1967  Sheet 1 of 3
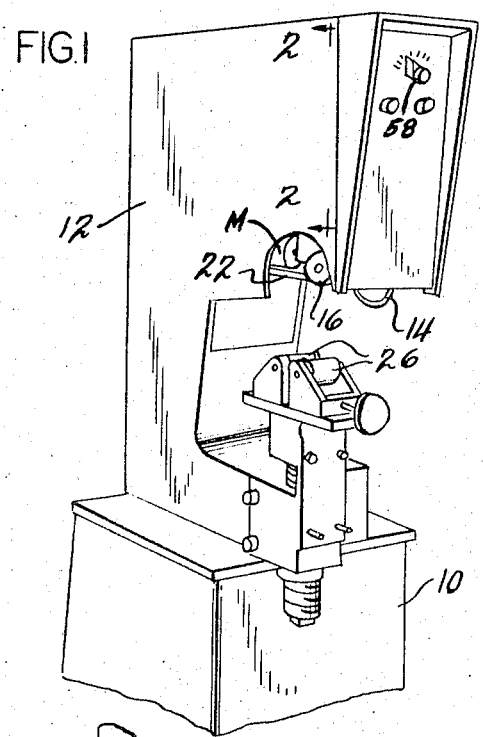
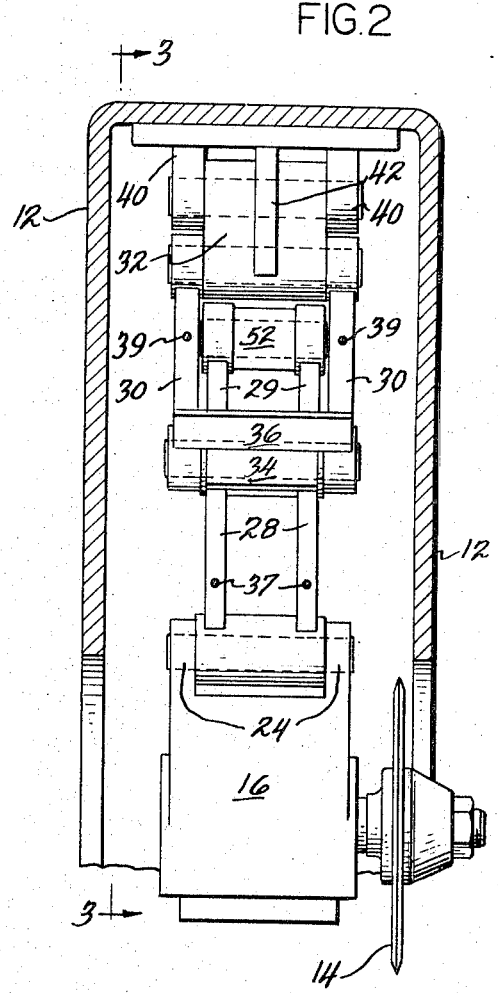
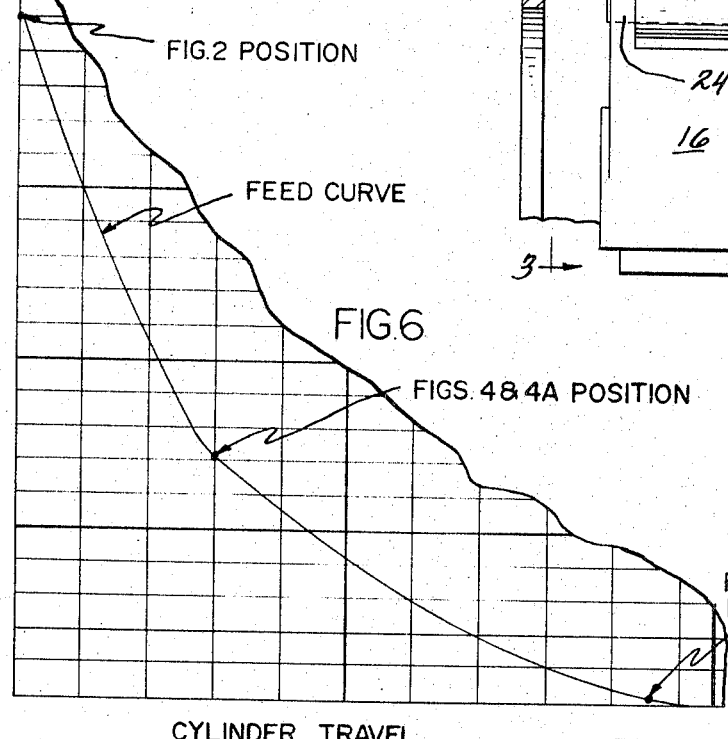
INVENTOR
ROBERT L. SHALLENBERG
BY Bair, Freeman & Molinare
ATTORNEYS.

June 24, 1969  R. L. SHALLENBERG  3,451,295

MACHINE TOOL FEED MECHANISM

Filed June 9, 1967  Sheet 3 of 3

INVENTOR
ROBERT L. SHALLENBERG
BY Bair, Freeman & Molinare
ATTORNEYS.

United States Patent Office 3,451,295
Patented June 24, 1969

3,451,295
MACHINE TOOL FEED MECHANISM
Robert L. Shallenberg, Wheaton, Ill., assignor to K-Line Corporation, Geneva, Ill., a corporation of Illinois
Filed June 9, 1967, Ser. No. 645,003
Int. Cl. B26d 7/00
U.S. Cl. 82—86                              9 Claims

ABSTRACT OF THE DISCLOSURE

Feed control linkage for a machining element which decreases the feed speed from entry of the machining element into a piece of stock to completion of passage thru the stock. At the same time, the control linkage progressively increases the available leverage of a power element which energizes the linkage.

---

This invention relates to feed mechanism for a machine tool, and particularly for a cut-off tool for tubular stock and the like.

One object of the invention is to provide a relatively simple and inexpensive linkage system, and power means for operating the same which are somewhat similar to that disclosed in the Shallenberg and Everett Patent No. 3,222,962, and wherein the linkage system is so designed as to provide rapid feed during the major portion of the feed of the machining element through the stock and a slower tapering-off speed during the remainder of the feed motion so as to eliminate the formation of a burr as the machining element completes the cut-off operation. During such operation, the linkage also provides a progressively increasing force operable to feed the machining element thru the stock.

Another object is to provide a feed mechanism in the form of a supporting arm pivotally mounted at one point on the frame of a machine tool and adapted to support a machining element for cut-off movement through a piece of stock, a toggle link system being provided connecting a point on the arm spaced from its pivot connection to the frame and extending to and pivoted to another point on the frame whereby power means operatively connected to the linkage system can be actuated to operate the system.

Still another object is to provide a linkage system comprising three toggle levers pivoted in tandem between the machining element supporting arm and the frame, stop means being provided to limit the angle between two of the toggle levers, a spring connection being provided between these two levers to normally retain the stop means engaged, and a stationary stop being provided for the third toggle lever carried by the frame, the third toggle lever being normally spaced from the stationary stop and engaging it after partial travel of the power means whereupon the first and second toggle levers are pivoted relative to each other against the bias of the spring to separate the stop means on the first two levers and further feed the machining element at the reduced and tapering-off speed of feed and increase of leverage heretofore mentioned.

A further object is to provide the first and second levers and the second and third levers normally at obtuse angles relative to each other and movable toward aligned positions for slowing down the feed rate as the third toggle lever approaches the stationary stop, and for further slowing down the feed rate at the end of the cut as the first and second levers approach a position of alignment.

Still a further object is to provide simple power means in the form of a pneumatically or hydraulically operable piston reciprocable in a cylinder for operating the toggle linkage system.

With these and other objects in view, my invention consists in the construction, arrangement and combination of the various parts of my machine tool feed mechanism, whereby the objects above contemplated are attained, as hereinafter more fully set forth, pointed out in my claims and illustrated in detail on the accompanying drawings, wherein:

FIG. 1 is a perspective view of a machine tool such as one for the cut-off of tubular stock to which my feed mechanism has been applied;

FIG. 2 is an enlarged sectional view on the line 2—2 of FIG. 1, showing an end view of my feed mechanism;

FIG. 6 is a graph showing the variation in feed rate and leverage produced by my linkage system during a feed cycle.

Figure 3:
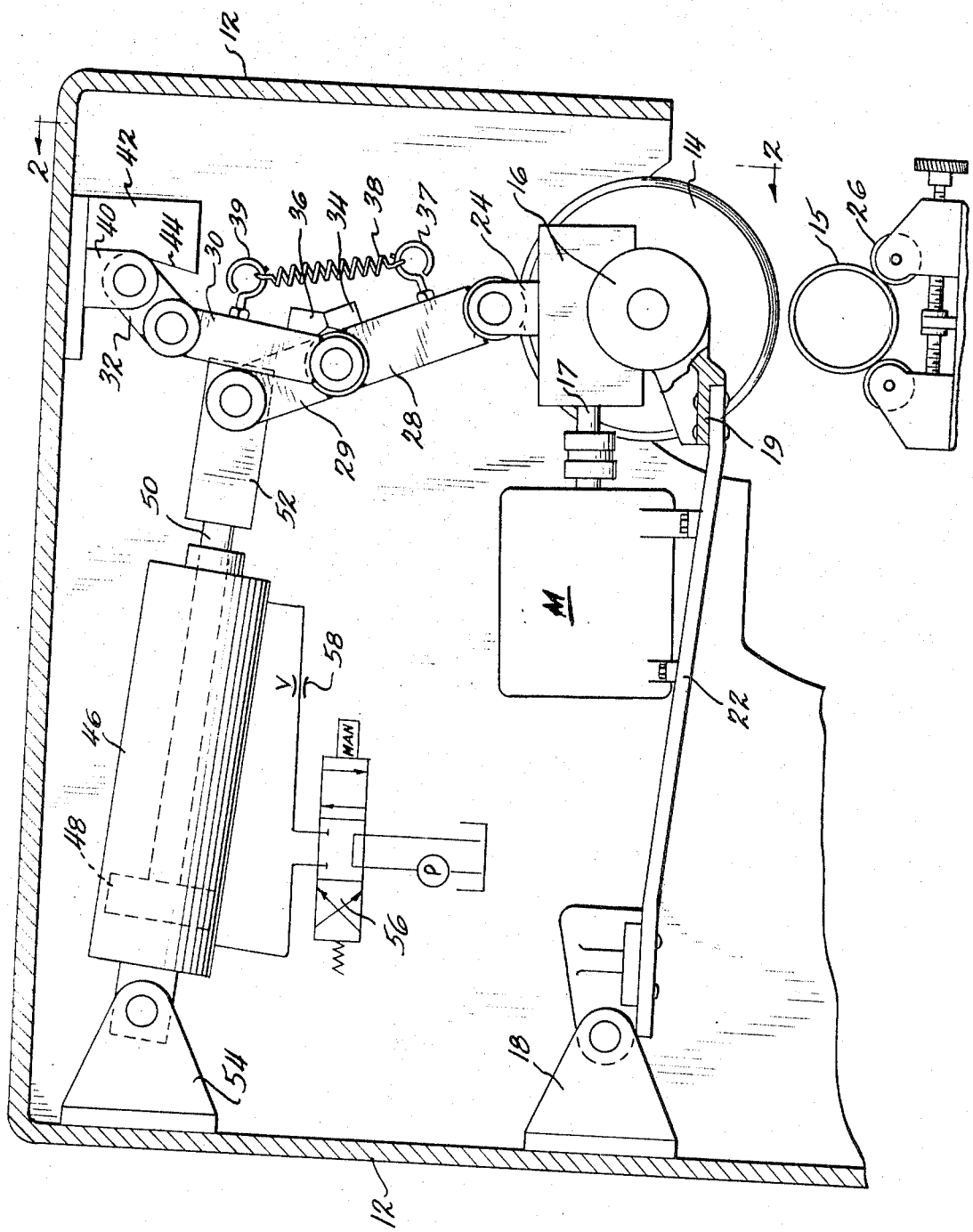
FIG. 3 is a sectional view on the line 3—3 of FIG. 2 showing a side elevation thereof, a normal or initial position of the toggle linkage system, a motor for operating the machining element and a hydraulic system for the power means which operates the toggle linkage.

On the accompanying drawings I have used the reference numeral 10 in FIG. 1 to indicate the base of a machine tool on which is mounted a housing 12 for a machining element 14 such as a knife edged cut-off disc of steel or the like. A gear case 16 supports the machining element 14 for rotation, and a drive shaft 17 projects therefrom with which an electric motor or the like M is operatively connected.

For supporting the machining element 14 relative to a piece of stock 15, such as tubular stock, brackets 18 are provided in the housing 12 with which a supporting arm is pivotally connected, the right-hand end of the arm as shown in FIG. 3 being connected to a bracket 19 of the gear case 16. The supporting arm 22 supports the machining element 14 in a definite axial position, yet permits movement downwardly from the normal position thereof shown in FIG. 3 above the stock 15 to a lower position shown in FIGS. 4 and 4A, and a still lower position shown in FIGS. 5 and 5A. The stock is supported for rotation during a cut-off operation by a pair of rollers 26 which are vertically adjustable relative to the base 10 of the machine to support the stock so that the final portion of the feed therethrough is at a desired decelerated rate as will hereinafter appear. The stock 15 is severed through a rolling action which eliminates chips.

Figure 4:
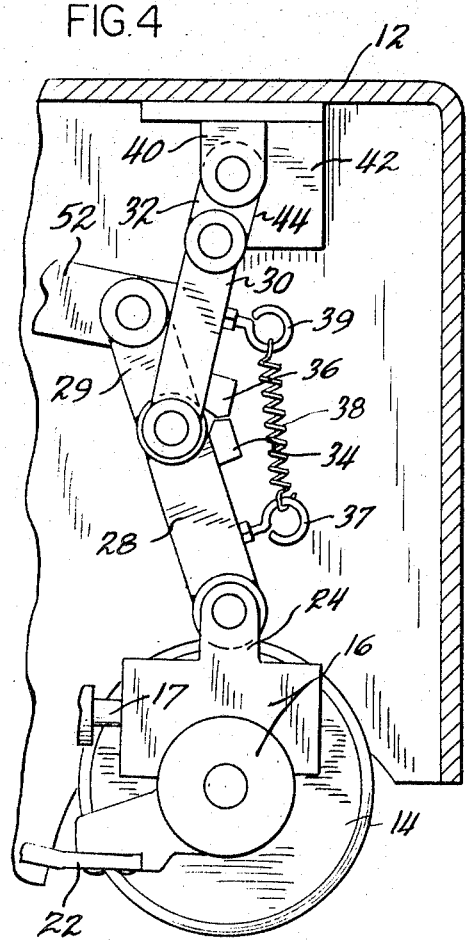
FIGS. 4 and 5 are sectional views similar to a portion of FIG. 3, showing an intermediate and a final position of the toggle linkage system respectively.
Figure 5:
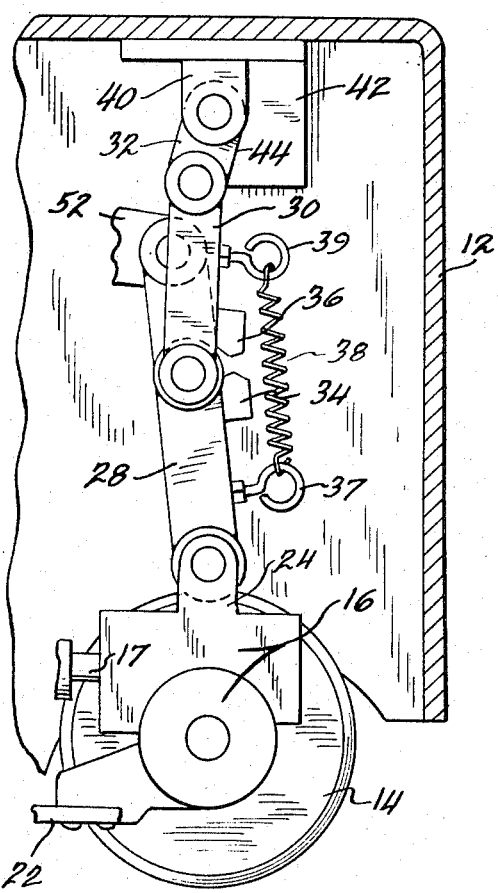
Figure 4A:
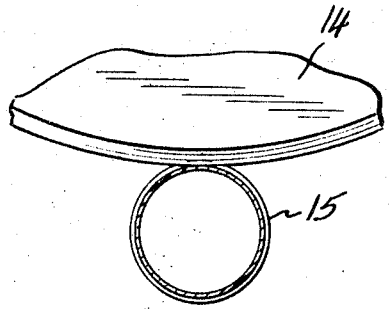
FIGS. 4A and 5A are enlarged cross-sectional views showing the relationship of a stock cut-off tool or the like with respect to tubular stock when the linkage system is in the positions of FIGS. 4 and 5, respectively.
Figure 5A:
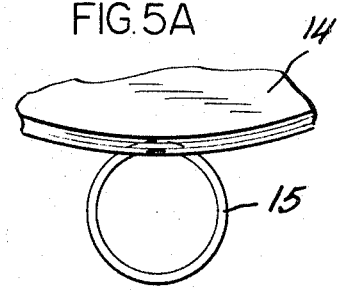

My toggle linkage system comprises a first link 28, a second link 30, and a third link 32, all three being pivoted in tandem between ears 24 on the top of the gear case 16 and a bracket 40 secured to the top of the housing 12. The links 28 and 30 are provided with stop means comprising stop plugs 34 and 36 normally engaged with each other as shown in FIG. 3, and a stationary stop 42 is provided for the link 32 and has a stop shoulder 44 to be engaged by the link as shown in FIGS. 4 and 5. Two springs 38 are connected between two eyes 37 and two eyes 39 of the links 28 and 30 as shown in FIG. 3, and normally tend to hold the stop lugs 34 and 36 in engagement with each other. The springs are omitted from FIG. 2 wherein the eyes 37 and 39 are shown sectioned.

The link 28 has an extension 29 to which a head 52 is pivoted, the head being carried by a piston rod 50 terminating in a piston 48 within a cylinder 46. The cylinder 46 is pivoted to a bracket 54.

From the arrangement of the parts just described it will be obvious that when the piston 48 is extended relative to the cylinder 46, it will swing the first link 28 clockwise. The springs 38 are heavy enough to keep the stop lugs 34 and 36 in engagement with each other and accordingly the second toggle lever 30 will swing as a unit with the first toggle lever 28, causing counter-clockwise swinging of the third toggle lever 32 until the position of FIG. 4 is reached. Thereupon the third toggle lever 32 can no longer be swung counter-clockwise and accordingly the obtuse angle between the second link 30 and the first link 28 will be decreased, the stop lugs 34 and 36 separating from each other as in FIG. 5, wherein the levers 28 and 30 it will be noted have approached an aligned position with respect to each other.

In FIG. 6 the vertical distance traveled by the machining element 14 has been plotted against cylinder travel. The first part of the curve from the "FIG. 2 position" to the "FIGS. 4 and 4A position" is relatively steep, whereas between the "FIGS. 4 and 4A position" and "FIGS. 5 and 5A position," it is relatively gradual and decelerates adjacent this latter position. Accordingly, the rate of feed through the stock 15 may be as rapid as feasible, yet near the end of the cut through the stock, the feed rate has decreased to such an extent that there will be a very gentle breakthrough at the bottom of the work piece which eliminates objectional burrs. Thus, by utilizing a compound 3-link toggle linkage system of the kind herein disclosed, the desired change of feed rate in a decreasing direction and at the same time change of feed leverage in an increasing direction are accomplished with relatively simple mechanism. Analyzing the linkage disclosed, the vertical force available to drive the cutting blade 14 into the stock is a function of the slope of the feed curve shown in the graph (FIG. 6). The more nearly this slope is vertical, the less multiplication of the cylinder power is obtained relative to the blade feed power. The more nearly this curve approaches horizontal, the higher the ratio between the cylinder power applied and the vertical force available to feed the blade. In fact, at the horizontal asymptote the ratio is infinite, and theoretically a 100# cylinder force could produce an infinite vertical force on the cutting blade.

For stability and accurate non-chattering control of the feed rate, the links 28 and 30 are preferably double in character, as shown in FIG. 2, and the link 32 relatively wide with the bracket 40 being in the form of a pair of ears. Also the use of two springs 38 is preferable.

For controlling the reciprocations of the piston 48 relative to the cylinder 46 a pressure fluid system such as a pneumatic or hydraulic system may be provided. The latter is shown diagrammatically in FIG. 3, a pump at P and a main control valve at 56 with forward manual control F and spring return when the manual control is released. A variable flow rate control valve 58 may be nicely adjusted for varying the overall feed rate—slower for large and/or harder stock and vice versa.

Some changes may be made in the construction and arrangement of the parts of my machine tool feed mechanism without departing from the real spirit and purpose of my invention, and it is my intention to cover by my claims any modified forms of structure or use of mechanical equivalents which may reasonably be included within their scope.

I claim as my invention:

1. Feed mechanism for a machine tool comprising a frame, a supporting arm pivotally mounted on said frame and adapted to support a machining element for movement through a piece of stock, a linkage system connected between a point on said arm spaced from its pivotal connection to said frame and another point on said frame, and power means operatively connected to said linkage system for operating said system through a feed stroke, said linkage system comprising three toggle levers pivoted in tandem between said arm and said another point on said frame, stop means limiting the angle between two of said toggle levers to normally retain said stop means engaged, and a stationary stop for said third toggle lever carried by said frame, said third toggle lever being normally spaced therefrom and engaging said stationary stop after partial travel of said power means whereupon said first and second toggle levers are pivoted relative to each other against the bias of said spring.

2. Feed mechanism for a machine tool according to claim 1 wherein said first and second toggle levers and said second and third toggle levers are at obtuse angles relative to each other in the normal position of said linkage system.

3. Feed mechanism for a machine tool according to claim 2 wherein said second and thrid toggle levers are in substantial alignment upon said third toggle lever engaging said stationary stop and said first and second toggle levers are in substantial alignment at the end of the feed stroke of said power means.

4. Feed mechanism for a machine tool according to claim 1 wherein the speed of feed of said machining element through the stock is relatively fast during during movement of said third toggle lever from normal position to engagement with said stationary stop and relatively slow after said stop means are separated by relative pivotal movement between said first and second toggle levers, and the speed of feed decelerates during the relative pivotal movement of said first and second toggle levers.

5. Feed mechanism for a machine tool according to claim 1 wherein the leverage for feed of said machining element through the stock is relatively small during movement of said third toggle lever from normal position to engagement with said stationary stop and relatively great after said stop means are separated by relative pivotal movement between said first and second toggle levers, and the leverage for feed accelerates during the relative pivotal movement of said first and second toggle levers.

6. Feed mechanism for a machine tool according to claim 1 wherein said power means comprises a cylinder, a piston therein operatively connected with said linkage system, and a pressure fluid system for propelling said piston relative to said cylinder.

7. Feed mechanism for a machine tool according to claim 1 wherein said first toggle lever has an extension beyond its pivotal connection to said second toggle lever, said power means being pivoted to said extension.

8. Feed mechanism for a machine tool according to claim 1 wherein said first toggle lever has an extension beyond its pivotal connection to said second toggle lever, and said power means comprises a piston operatively connected with said extension, a cylinder in which said piston is reciprocal, and a pressure fluid system for propelling said piston relative to said cylinder.

9. Feed mechanism for a machine tool according to claim 8 wherein means is provided to adjustably restrict the flow of fluid pressure in said pressure fluid system to thereby regulate the speed of operation of said power means.

References Cited

UNITED STATES PATENTS

| | | | |
|---|---|---|---|
| 827,227 | 7/1906 | Freeman | 82—86 |
| 1,801,038 | 4/1931 | Ewing | 82—86 |
| 3,222,962 | 12/1965 | Everett et al. | 82—83 |

HARRISON L. HINSON, *Primary Examiner.*